(12) United States Patent
Manthe, III

(10) Patent No.: US 7,825,833 B2
(45) Date of Patent: Nov. 2, 2010

(54) COMPUTER KEYBOARD

(76) Inventor: Leslie William Manthe, III, 2801 Sapphire Dr., Modesto, CA (US) 95355

( * ) Notice: Subject to any disclaimer, the term of this patent is extended or adjusted under 35 U.S.C. 154(b) by 968 days.

(21) Appl. No.: 11/651,291

(22) Filed: Jan. 9, 2007

(65) Prior Publication Data

US 2008/0165034 A1    Jul. 10, 2008

(51) Int. Cl.
*H03M 11/00* (2006.01)
(52) U.S. Cl. .............. 341/20; 341/22; 341/35; 345/168; 345/169; 400/472; 400/489
(58) Field of Classification Search .......... 341/20, 341/22, 35; 345/168, 169; 400/472, 489
See application file for complete search history.

(56) References Cited

U.S. PATENT DOCUMENTS

| | | | | |
|---|---|---|---|---|
| 5,181,029 A | * | 1/1993 | Kim | 341/20 |
| 5,288,158 A | * | 2/1994 | Matias | 400/472 |
| 5,336,002 A | * | 8/1994 | Russo | 400/489 |
| 5,497,151 A | | 3/1996 | Dombroski | |
| 5,644,303 A | * | 7/1997 | Gioscia | 340/825.72 |
| 5,661,505 A | * | 8/1997 | Livits | 345/169 |
| 5,764,164 A | | 6/1998 | Cartabiano et al. | |
| 6,084,576 A | * | 7/2000 | Leu et al. | 345/168 |
| 6,111,527 A | * | 8/2000 | Susel | 341/22 |
| 6,142,687 A | * | 11/2000 | Lisak | 400/472 |
| 6,262,716 B1 | * | 7/2001 | Raasch | 345/168 |
| 6,348,878 B1 | | 2/2002 | Tsubai | |
| 6,765,502 B2 | | 7/2004 | Boldy et al. | |
| 6,876,313 B2 | * | 4/2005 | Hsiung et al. | 341/35 |
| 6,950,038 B2 | * | 9/2005 | Hsu | 341/22 |
| D525,622 S | | 7/2006 | Manthe, III | |
| 7,123,242 B1 | * | 10/2006 | Henty | 345/169 |
| 7,626,516 B2 | * | 12/2009 | Griffin et al. | 341/22 |

\* cited by examiner

*Primary Examiner*—Albert K Wong
(74) *Attorney, Agent, or Firm*—Stetina Brunda Garred & Brucker

(57) ABSTRACT

A keyboard for one-handed data input is disclosed. The keyboard includes a primary keypad including a first set of keys. The primary keypad is defined by a first side and an opposed second side. The keyboard also includes an auxiliary keypad including a second set of keys, as well as an input selection pad with a multiple position switch. The switch is used to selectively map the keyboard to various input value sets. The auxiliary keypad is attached to the first side, while the input selection pad is attached to the second side. There is also a rest pad centrally mounted to the primary keypad.

14 Claims, 5 Drawing Sheets

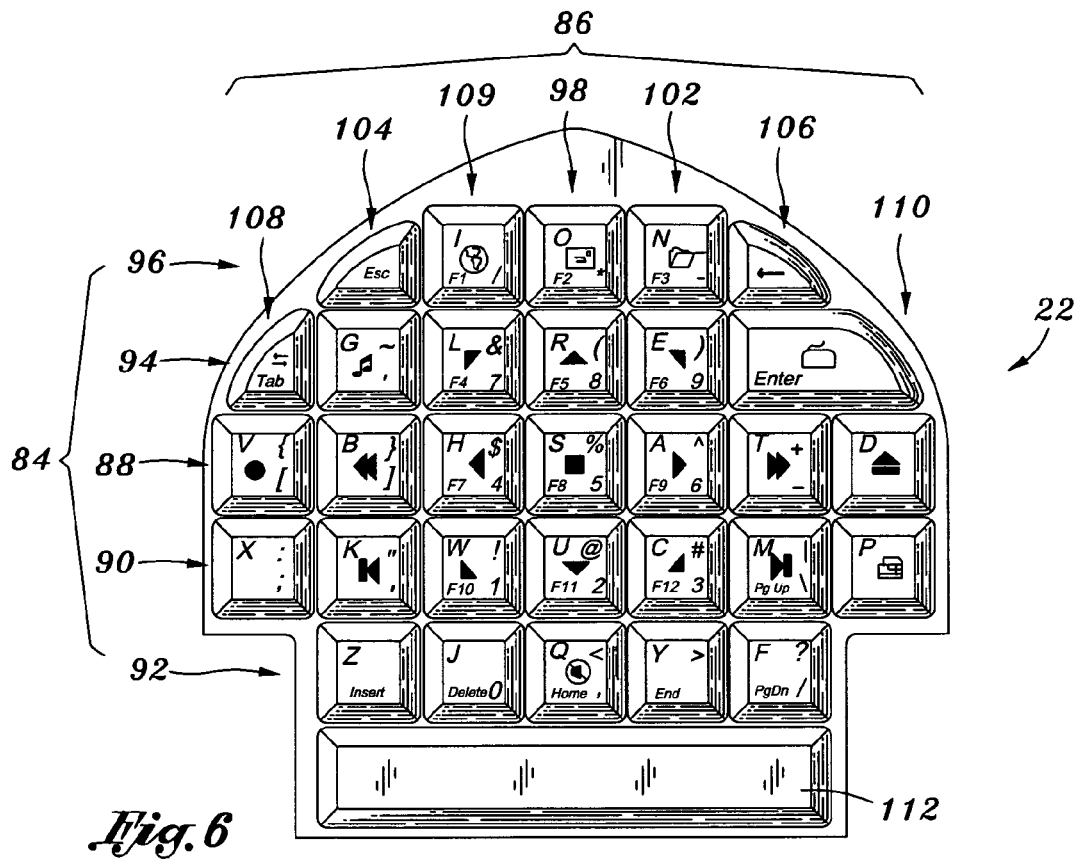
Fig. 6
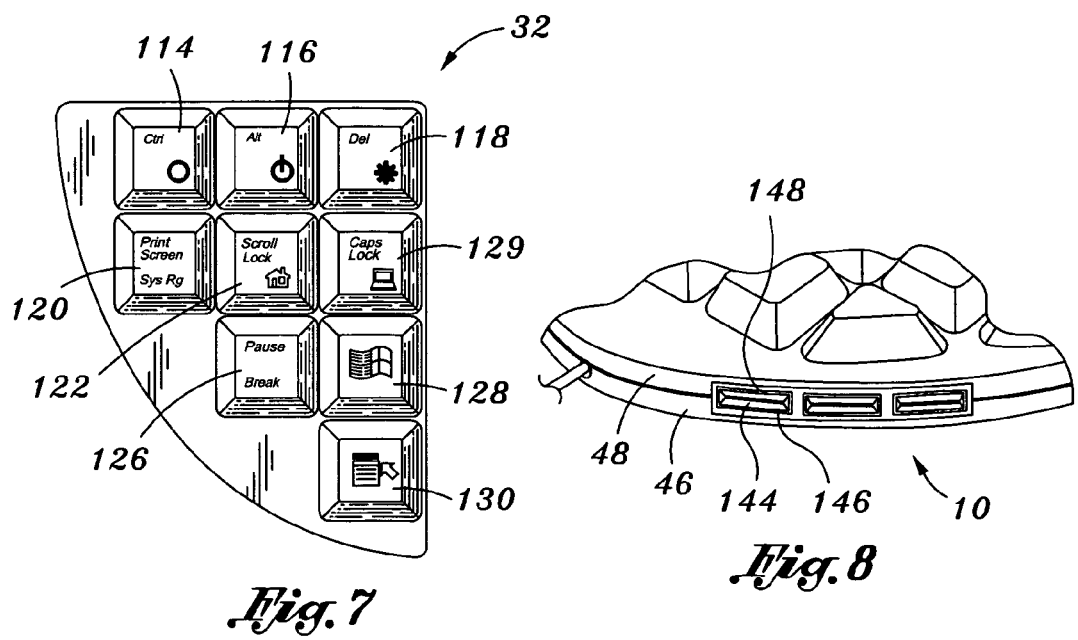
Fig. 7
Fig. 8

COMPUTER KEYBOARD

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field of the Invention

The present invention generally relates to an alphanumeric data input device. More particularly, the present invention relates to a programmable, one-handed keyboard for use with a computer or other data processing device.

2. Background

Keyboards are the most widely utilized data input device, and are typically configured for two-handed input. The keys on most keyboards are arranged according to the ubiquitous QWERTY layout, where the fingers of the typist rest on the home row keys. More specifically, the left hand rests on the letters A, S, D and F, and operates the keys on the left side of the keyboard, while the right hand rests on the letters J, K, and L, and operates the keys on the right side of the keyboard. All of the characters in the alphabet correspond to a key, and above the uppermost row of alphabetic keys is a row of numeric keys. In addition to the basic alphanumeric keys, a QWERTY keyboard includes one or more shift keys, a space key, an enter key, a tab key, control key, alternate key, and so forth, the functions thereof being well known in the art.

Conventionally keyboards are utilized to input data into text-based applications such as word processors, databases, and the like. For number-rich applications such as spreadsheets, keyboards typically include numeric keypads that are segregated from the standard alphanumeric keys. In such applications, there is no need to simultaneously control alternate input devices such as a mouse since the majority of tasks can be accomplished with standard keystrokes, shortcut keys, and the like. Where the mouse needs to be utilized in order to interact with certain graphics of such applications, one hand may be removed from the keyboard without much reduction in productivity by rapidly returning that hand to the keyboard when necessary to input text data. In other applications, it may be necessary to input data using one hand for extended periods of time while using the other hand for other purposes. For example, in CAD/CAM applications, it is necessary to manipulate the various graphical elements using a mouse, pen input device, or the like while entering dimensions, explanatory captions, and so forth. In another example, inventory recording applications may require the user to handle products while entering details thereof into a database. Therefore, there is a need in the art for one-handed keyboards for the above-described applications.

Another factor driving the need for one-handed keyboards is the increased miniaturization of portable data processing devices such as Personal Digital Assistants (PDAs), smart cellular phones having PDA-like features, laptop computers, and so forth. In this regard, there is a need for keyboards that have a commensurately smaller footprint. The trend has been to reduce the size of the individual keys while still maintaining the QWERTY layout. With substantial decreases in size, only thumb or index finger keying is possible, largely negating the benefits of preserving the layout. Familiarity with the position of each of the keys, however, retains some input efficiency. The cramped layout also increases stress on the fingers, leading to more acute repetitive stress injuries.

One type of one-handed keyboard is a "chording" keyboard. Exploiting the general principle of musical instruments such as pianos, simultaneous striking of various keys results in a distinct alphanumeric character being generated. Because of the finite number of characters that need to be generated, these keyboards have a small number of keys, typically five. The character "A" may be generated by striking the first key, while the character "Z" may be generated by striking all five keys. The complexity of the key sequences and the inefficiency of having to use more than one finger per character have hindered its widespread adoption.

Another approach to one-handed keyboard involves reducing the total number of physical keys, while assigning multiple values to the remaining keys. U.S. Pat. No. 5,288,158 to Matias proposes a one-handed keyboard comprising keys representing one half of a standard keyboard, and the same keys also representing the symmetrically opposite keys of a standard keyboard that are activated with a modifier key. As will be appreciated, the speed, pace, and rhythm of typing relies in part on alternating keystrokes, as it is faster to hit a first key and a second key with different fingers rather than hitting the same keys or different keys with the same finger. Although the Matias device retained the familiar QWERTY layout, there is a higher likelihood of any given keystroke requiring redundant, as opposed to alternating, keystrokes. Accordingly, there is a resulting loss in typing speed and data entry efficiency.

In another approach as proposed by U.S. Pat. No. 6,348,878 to Tsubai, a keyboard layout has fifteen keys, each having a primary letter and a secondary letter. The primary letter is keyed by solely striking the key, while the secondary letter requires striking a modifier key first or simultaneously with the key. Tsubai proposes a layout which minimizes finger travel and keystrokes to generate the most common letters and diagraphs in the English language. While largely eliminating the need to memorize complex chords and reducing instances of redundant keystrokes, typing efficiency is still reduced as compared to full keyboards because modifier keys must be utilized.

Accordingly, there is a need in the art for an improved one-handed keyboard which does not require the user to memorize complex chords or inefficiently fragment keystrokes with modifier keystrokes. There is also a need for a one-handed keyboard having full-sized keys and other ergonomic features while retaining a small footprint.

BRIEF SUMMARY

According to one aspect of the present invention, there is provided a keyboard for one-handed data input. The keyboard may include a primary keypad that defines a first side and an opposed second side, and may also include a first set of keys arranged in spaced rows and columns. The keyboard may also include an auxiliary keypad disposed on the first side of the primary keypad and projects therefrom and may have a second set of keys arranged in spaced rows and columns.

The keyboard may further include an input selection pad disposed on the second side of the primary keypad and projects therefrom. The input selection pad may include a multiple position switch. There may also be provided a rest pad that is centrally mounted to the primary keypad.

According to another aspect of the present invention, there is provided a one-handed keyboard that includes a primary keyboard with a first set of keys. The first set of keys may be associated with a one of first input values. A subset of the first set of keys may be associated with one of second input values. The one-handed keyboard may also include an input selection pad with a mechanical switch positionable to select between the first input values and the second input values. The input value selection pad may be engaged to the primary keypad.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 6 shows the key layout of the primary keypad in accordance with one embodiment of the present invention;

FIG. 7 shows the key layout of the auxiliary keypad in accordance with one embodiment of the present invention;

FIG. 8 is a magnified perspective view of the one handed keyboard, including Universal Serial Bus (USB) ports;

Common reference numerals are used throughout the drawings and the detailed description to indicate the same elements.

DETAILED DESCRIPTION

The detailed description set forth below in connection with the appended drawings is intended as a description of the presently preferred embodiment of the invention, and is not intended to represent the only form in which the present invention may be constructed or utilized. The description sets forth the functions of the invention in connection with the illustrated embodiment. It is to be understood, however, that the same or equivalent functions may be accomplished by different embodiments that are also intended to be encompassed within the scope of the invention. It is further understood that the use of relational terms such as first and second, top and bottom, and the like are used solely to distinguish one from another entity without necessarily requiring or implying any actual such relationship or order between such entities.

Figure 1:
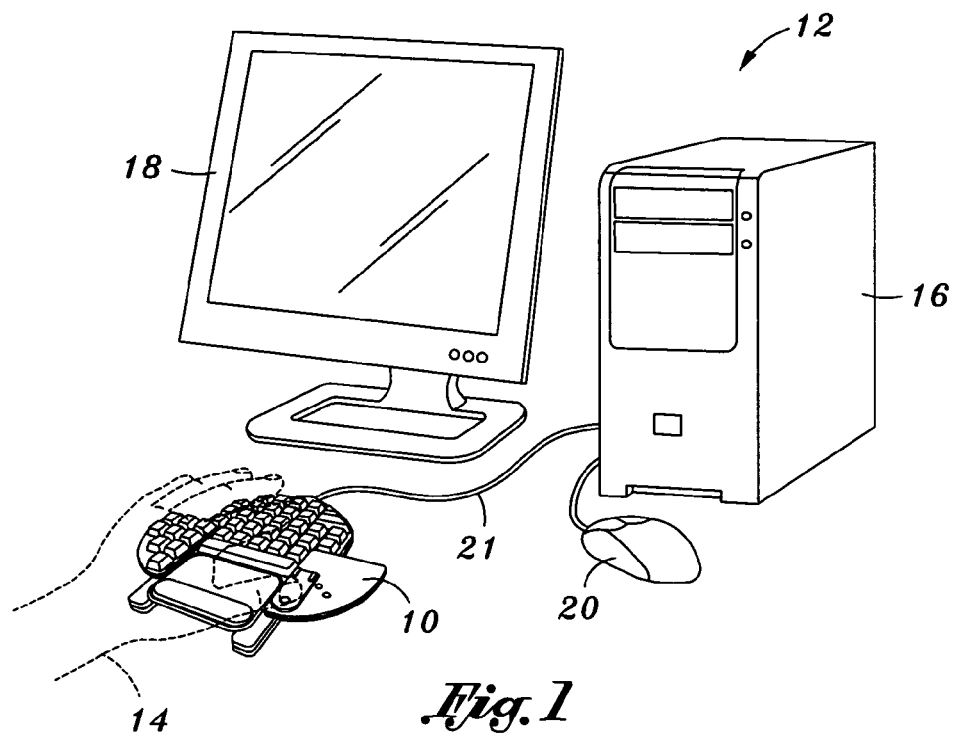
FIG. 1 is a diagram illustrating a one-handed keyboard according to one embodiment of the present invention being utilized to input data into a computer system.

Referring now to FIG. 1, an exemplary one-handed keyboard 10 in accordance with one embodiment of the present invention is connected to a system 12 to enable a user 14 to input data thereto. As will be appreciated by one of ordinary skill in the art, the system 12 typically includes a computer 16 that is configured to execute a variety of data processing operations, and a display 18 that outputs the results of such data processing operations. In addition to the one-handed keyboard 10, the system 12 may include a secondary input device such as a mouse 20. Though the exemplary system 12 is of the desktop type, it is understood that the present invention is not limited for use merely with such types of systems. Any suitable data processing system such as laptop computers, tablet computers, PDAs, and cellular phones, or other device capable of receiving alphanumeric character input may be readily substituted without departing from the scope of the present invention. According to one embodiment, the keyboard 10 is connected to the computer 16 over a Universal Serial Bus (USB) connection 21, though alternative connection modalities may be utilized, such as a PS/2 connection, Bluetooth, infrared, and the like.

Figure 2:
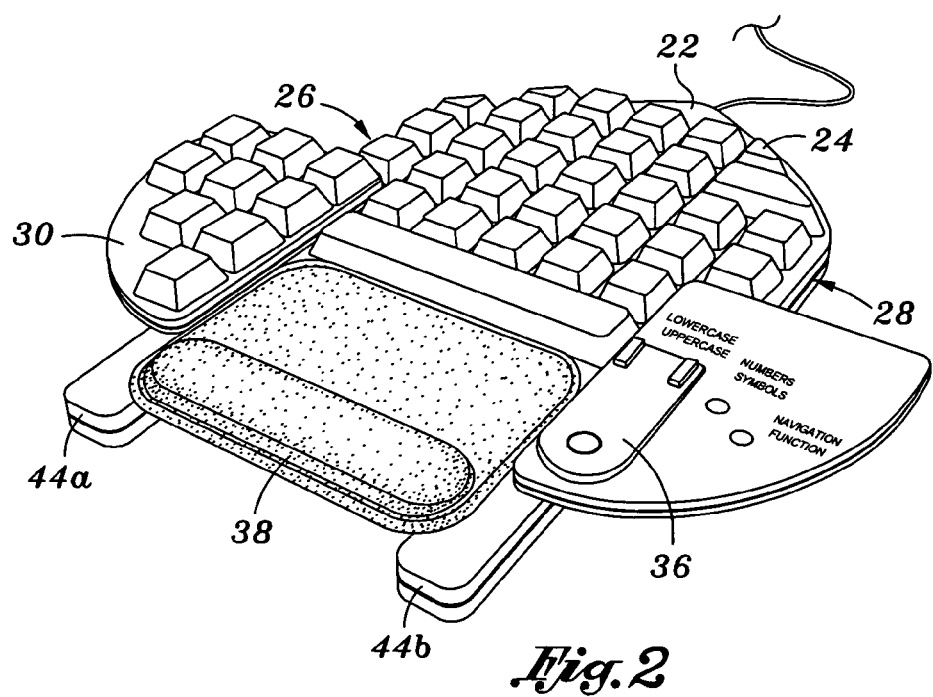
FIG. 2 is a perspective view of the one-handed keyboard.
Figure 3:
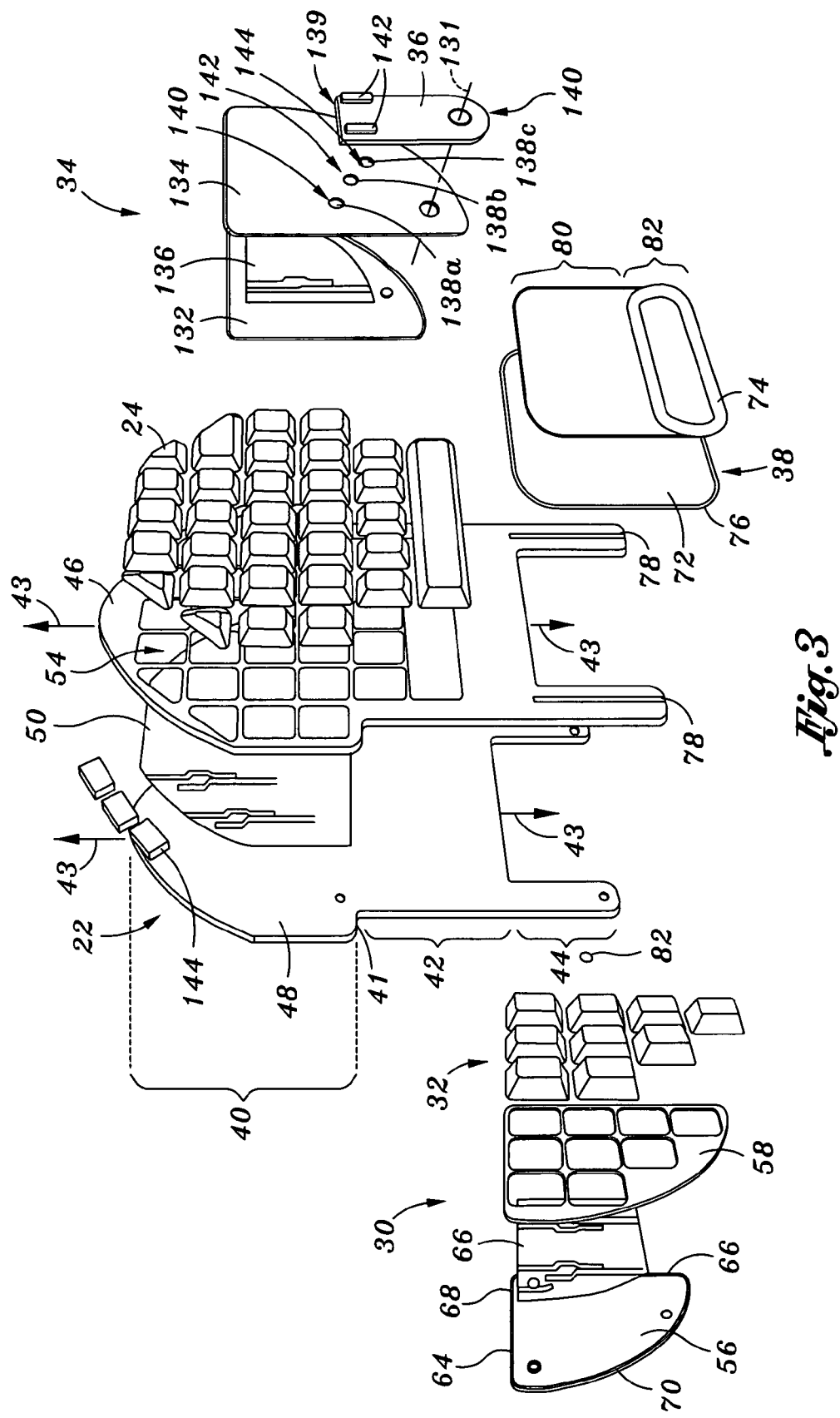
FIG. 3 is an exploded perspective view of the one-handed keyboard in accordance with one embodiment of the present invention illustrating its major subcomponents including a primary keypad, an auxiliary keypad, an input selection pad, and a rest pad.

As shown in FIGS. 2 and 3, the one-handed keyboard 10 includes a primary keypad 22 with a first set of keys 24 arranged in spaced rows and columns. The primary keypad 22 generally defines a first side 26 and an opposed second side 28. An auxiliary keypad 30 is disposed on the first side 26 and projects therefrom, and includes a second set of keys 32 also arranged in spaced rows and columns. The one-handed keyboard 10 further includes an input selection pad 34 disposed on the second side 28 and projects therefrom. The input selection pad 34 includes a multiple position switch 36. Centrally mounted to the primary keypad 22 is a rest pad 38. As shown in FIG. 1, it is envisioned that the four fingers of the hand are used to strike the first set of keys 24 and the second set of keys 32, and the thumb is used to operate the multiple position switch 36, while the palm rests on the rest pad 38.

According to one embodiment of the present invention as illustrated in FIG. 3, the primary keypad 22 is generally defined by an arcuate portion 40, a square portion 42, and a pair of opposed arms 44 extending from the square portion 42. A first arm 44a extends from the first side 26, while a second arm 44b extends from the second side 28. The first arm 44a and the second arm 44b are understood to extend in a parallel relation with respect to each other. Between the arcuate portion 40 and the square portion 42 there is an inset 41, in which the widest part of the arcuate portion 40 is wider than the square portion 42. A longitudinal axis 43 bisects the primary keypad 22, i.e., the arcuate portion 40, the square portion 42, and the arms 44 are symmetrical about the longitudinal axis 43. Preferably, the width of the square portion 42 is four and nineteen thirty-secondths of an inch (4¹⁹⁄₃₂"). Along these lines, the length of the primary keypad 22, including the arcuate portion 40, the square portion 42, and the arms 44, is preferably nine inches (9"). With both the auxiliary keypad 30 and the input selection pad 34 attached to the primary keypad 22, the width of the one-handed keyboard 10 is approximately nine inches (9"). It will be appreciated that the particular shapes and dimensions relating to the primary keypad 22 are presented by way of example only and not of limitation, and any other suitable shape may be substituted without departing from the scope of the present invention. Furthermore, while in the exemplary embodiment the arms 44 are integrally formed and are of a unitary construction with the primary keypad 22, it is understood that the arms 44 may be structurally independent from the keypad 22.

As shown in FIG. 3, the primary keypad 22 is comprised of a bottom cover 46 and top cover 48, which together enclose a printed circuit board 50. It is understood that the bottom cover 46 faces the surface upon which the keyboard 10 is placed, and in order to prevent slippage thereon, there is attached to the bottom cover 46 a set of grip pads 52. Preferably, the grip pads 52 are constructed of compression molded silicone rubber, though any other suitable material may be substituted.

The top cover 48 defines a plurality of key access slots 54 that match the outline and arrangement of the first set of keys 24. The bottom cover 46 and the top cover 48 is preferably injection molded acrylonitrile butadiene styrene (ABS) plastic, though any other suitable material may be substituted.

The printed circuit board 50 includes various switches that, when depressed, generates a signal representative of the key press to an on-board controller. The on-board controller may then convert the signal for transmission over the selected modality, such as the aforementioned USB connection 21. Power to the on-board controller and other related electronic circuits may be provided over the USB connection 21. The specific implementation of the keyboard logic control is understood to be within the capabilities of one of ordinary skill in the art.

The auxiliary keypad 30 has an ellipse sector shape, with a first straight edge 64 and a second straight edge 66 extending from a common point 68, and connected with an arcuate edge 70. In further detail, the auxiliary keypad is comprised of a bottom cover 56 and a top cover 58, and encloses an auxiliary printed circuit board 60. The length of the second straight edge 66, i.e., the length of the auxiliary keypad 30, according to a preferred embodiment, is three and nine sixteenths of an inch (3 9/16"). The top cover 58 defines a plurality of key access slots 62 that match the outline of the second set of keys 32. The auxiliary printed circuit board 60 includes switches that, when activated, generates a signal to the on-board controller that is representative of the key press. In order to properly communicate such key presses, the auxiliary printed circuit board 60 is in electrical communication with the printed circuit board 50. As indicated in relation to the top and bottom covers 46, 48 of the primary keypad 22 above, the bottom cover 56 and the top cover 58 is preferably injection molded ABS plastic, though any other suitable material may be substituted.

Figure 4:
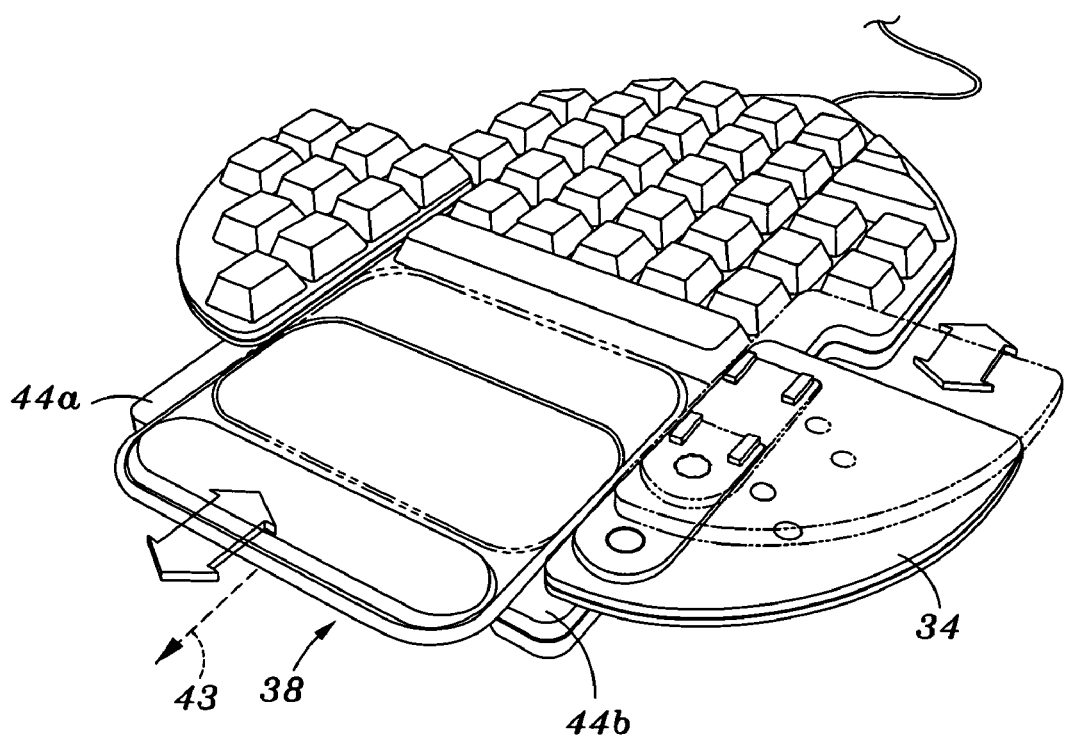
FIG. 4 is a detailed perspective view of the one-handed keyboard with the range of motion of the rest pad and the input selection pad being shown.

In accordance with one embodiment of the present invention, the rest pad 38 is comprised of a tray 72 and a cushion 74. The tray 72 is rectangular in shape, and has a vertical lip 76 circumscribing the outline thereof to frictionally and removably retain the cushion 74. Furthermore, the tray 72 is slidably engaged to the first and second arms 44a, 44b. In this regard, the side of the tray 72 opposite the lip 76 may be provided with a member that engages a rail 78 on the first and second arms 44a, 44b. It is expressly contemplated that upon being properly positioned, the tray 72 may be locked to prevent any further movement. However, any other suitable structure for a sliding engagement is deemed to be within the scope of the present invention. As shown in FIG. 4, the tray 72 slides along the longitudinal axis 43, and is intended to accommodate a wide variety of hand sizes.

With reference back to FIG. 3, the cushion 74 includes a planar portion 80 and a protruding portion 82. It is understood that the cushion 74 is impact-absorbent, and reduces stress upon the palm of the user 14, specifically, at the protruding portion 82. According to one preferred embodiment of the present invention, the cushion 74 is a neoprene shell filled with supple gel material and covered with Lycra. The gel may be in liquid or solid form, and any well known impact resistant material may be readily substituted without departing from the scope of the present invention. It is contemplated that the neoprene shell may be variously colored, and as indicated above, intended to be interchangeable, thereby providing further personalization options.

Referring to FIG. 4, the input selection pad 34 also includes a mechanism by which it slides along the one of the first and second arms 44a, 44b in a parallel relation to the longitudinal axis 43. As will be further detailed below, the input selection pad 34 may be slidably engaged to either one of the first arm 44a or the second arm 44b to accommodate left and right handed users. It is understood that such mechanism may be identical to the rail assembly described above in relation to the rest pad 38, though any other suitable mechanism may be utilized. For maximizing the adjustment range, the input selection pad 34 is separate from the sliding mechanism of the rest pad 38. As indicated above, the adjustable position of the input selection pad 34 improves the ergonomic characteristics of the one-handed keyboard 10, such that the user need not over-extend nor restrict the thumb during use.

Each of the first set of keys 24 and the second set of keys 32 is mapped to a corresponding input value generated in response to that key being pressed. As used herein, the term input value refers to the data that is transmitted to the computer 16 or other like device capable of receiving input from the one-handed keyboard 10. For example, when the "A" key is pressed, data representative of the character "A" is transmitted to the computer 16.

Referring to FIG. 6, and as set forth above, the primary keypad 22 includes a first set of keys 24 arranged in multiple rows 84 and columns 86. More specifically, the primary keypad 22 has a first center row 88 and a second center row 90, each seven keys wide. Each of the keys of the first and second center rows 88, 90 are mapped to character input values, or input values that are representative of alphabetical characters. Below the second center row 90 is a lower row 92 with five keys, each of which are also mapped to character input values. Above the first center row 88 is an upper row 94 with six keys, though only four are mapped to character input values. Above the upper row 94 is a top row 96 with five keys, three of which are mapped to character input values. The arrangement of each of the rows 84 is generally centered about a center column 98. The center column 98 is five keys high, each being mapped to character input values. To the immediate left and right is a left central column 100 and a right central column 102, respectively, each five keys long and mapped to character input values. To the left and right of the left central column 100 and the right central column 102 are a left intermediate column 104, and a right intermediate column 106, respectively. The left intermediate column 104 is comprised of five keys, though only four of the five keys are mapped to character input values. The right intermediate column 106 is also comprised of five keys, with three being mapped to character input values. It is expressly contemplated that all twenty six letters of the alphabet may be represented without resorting to modifier keys and the like. Below the lower row 92 is a space bar 112 that extends the length thereof, or five key lengths. Henceforth, when referring to specific keys, the grid system as set forth above will be utilized. For example, when describing the Escape key, it will be understood that reference is being made to the key in the top row 96, left intermediate column 104.

According to an embodiment of the present invention, the mapping between the first set of keys 24 and the input value is user programmable. More specifically, any of the keys in primary keypad 22 may be assigned to generate different input values than the default value. For example, key in the first center row 88, right central column 102, by default being mapped to an input value of "A" may be re-programmed to generate an input value of "D." The entire arrangement of the first set of keys 24 may be modified. In one preferred embodiment, the most commonly used keys may be set beneath the most dexterous fingers, with the settings being modifiable for each user. Alternatively, the keys 24 may be arranged in such a manner as to minimize finger travel and keystrokes, particularly redundant ones, to generate the most common letters and digraphs of the English language. Generally, the character input values may be re-mapped, while the non-character input values remain static. For example, the tab key located in the upper row 94, left column 108 is not reprogrammed. Where the user so desires, the tab key may be reprogrammed.

With reference to FIG. 7, the second set of keys 32 on the auxiliary keypad 30 are likewise arranged in rows and columns. The second set of keys 32 include a control key 114, an alternate key 116, a delete key 118, a print screen/system request key 120, a scroll lock key 122, a caps lock key 124, a pause/break key 126, a windows key 128, and a context menu key 130. Those of ordinary skill in the art will be able to recognize the generally common functions of the respective keys. Generally, there is no need for re-programming the arrangement of the second set of keys 32, though if desired it is possible to do so. It will be appreciated that the input values correlated to the second set of keys 32 is presented by way of example only and not of limitation.

According to another embodiment of the present invention, a subset of the first set of keys 24 are mapped to a plurality of corresponding input values. More particularly, the keys mapped to character input values by default have multiple input values associated therewith. For example, the key assigned to the letter "A" in the first center row 88, right central column 102 has an upper case input value, and a lower case input value. It is understood that some of the first set of keys 24 only have one input value associated therewith, such as the enter key in the upper row 94, right intermediate column 106 and right column 110. Related input values are referred to as being a member of an input value set. As an example, all of the lower case input values are said to be in a lower case input value set, while all of the upper case input values are said to be in an upper case input value set. Generally, all of the first set of keys 24 is mapped to one input value set at any given point, and where it is necessary to map to another input value set, each of the first set of keys 24 are re-mapped.

Other input value sets include sets of numerical values, sets of symbolic values, sets of function input values, sets of navigation input values, and sets of miscellaneous input values. The same first set of keys 24 may thus be utilized to generate a wide variety of input values. It will be understood that numerical values refers to numeral characters 0-9, while symbolic values refers to symbols including "`" (grave accent) "~" (tilde), "!" (exclamation point), "@" (at symbol), "#" (pound sign), "$" (dollar sign), "%" (percent sign), "^" (caret), "&" (ampersand), "*" (asterisk), "(" (open parenthesis), ")" (close parenthesis), "-" (dash), "_" (underscore), "+" (plus sign), "=" (equal sign"), "{" (open brace), "}" (close brace), "[" (open bracket), "]" (close bracket), "|" (pipe), "\" (forward slash), ";" (semicolon), ":" (colon), """ (quotation mark), "'" (apostrophe), "<" (open angle bracket), ">" (close angle bracket"), "," (comma), "." (period), "/" (backslash), and "?" (question mark). It will be appreciated by those having ordinary skill in the art that the above commonly used symbols differ from country to country, and the set of symbolic values are localized. The function input values refer to the F1-F12 function inputs, and navigation input values refer to back, forward, up, and down inputs which are generally operable to direct the movement of a cursor. Miscellaneous input values refer to insert, home, end, page up, and page down inputs.

Continuing with the above example, the key assigned to the letter "A" in the first center row 88, right central column 102 also has a mapped input value of a caret sign "^" function input F9, numerical value 6, and a forward arrow. As shown on the markings, the remaining keys of the first set 24 also have multiple input values associated therewith.

Figure 5:
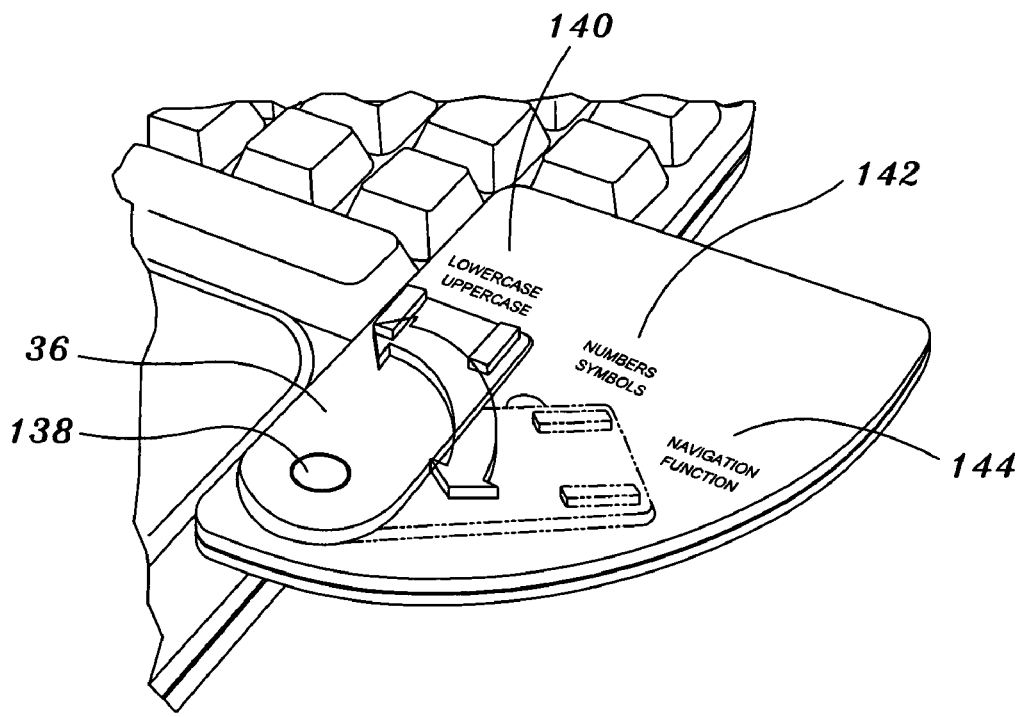
FIG. 5 is a detailed perspective view of the input selection pad showing the range of motion of a multiple position switch disposed thereon.

The multiple position switch 36 selectively maps the first set of keys 24 to the input value sets. Referring to FIGS. 3 and 5, the multiple position switch 36 is mounted to the input selection pad 34, which is comprised of a bottom cover 132, a top cover 134. The input selection pad 34 has a similar shape as that of the auxiliary keypad 30 as described above, though alternative shapes may be substituted without departing from the scope of the present invention. As indicated in relation to the top and bottom covers 46, 48 of the primary keypad 22 above, the bottom cover 132 and the top cover 134 is preferably ABS plastic, though any other suitable material may be substituted. The bottom cover 132 and the top cover 134 encloses a printed circuit board 136 that includes various switches and circuitry that will be described in further detail below. The multiple position switch 36 rotates about a switch axis 137, and has a first angular stop position 140, a second angular stop position 142, and a third angular stop position 144. At each of the angular stop positions 140, 142, 144, the multiple position switch 36 has a raised contact position and a lowered contact position. In this regard, the multiple position switch 36 may also be referred to as a combination push and rotary switch.

Each of the raised and lowered contact positions is associated with a one of the selectively mapped input value sets. Specifically, with the multiple position switch 36 in the raised contact position at the first angular stop position 140, the lower case alphabetical input value set is selected. In such a state, the first set of keys 24 generates lower case alphabet characters. With the multiple position switch 36 in the lowered contact position at the first angular stop position 140, the upper case alphabetical input value set is selected, where the first set of keys 24 generates upper case alphabetical characters. Where the multiple position switch 36 is in the raised contact position at the second angular stop position 142, the numerical input value set is selected. Thus, pressing the keys particularly mapped to a numerical value, specifically, those keys in the upper row 94, the first center row 88, and the second center row 90 between the left central column 100, the center column 98, and the right central column 102, generates a numerical input value. With the multiple position switch 36 in the lowered contact position at the second angular stop position 142, the symbolic input value set is selected. Along these lines, with the multiple position switch 36 in the raised contact position at the third angular stop position 144, the navigation input value set is selected, while in the lowered contact position at the third angular stop position 144, the function input value set is selected.

In accordance with one embodiment of the present invention, as shown in FIG. 3, at the first, second and third angular stop positions 140, 142, and 144, there are momentary pushbuttons 138a-c that signals to the onboard controller that a different input value set is being selected. Thus, with the multiple position switch 36 being pressed, so is the momentary pushbuttons 138a-c located thereunder. Each of the momentary pushbuttons 138a-c are electrically connected to the printed circuit board 136. The multiple position switch 36 has a generally elongate body with a distal end 140 and a proximal end 139 rotationally mounted to the top cover 134. The distal end 140 may include a pair of opposed rib-like protuberances 142 that are configured to grip the user's thumb. The multiple position switch 36 may be constructed of any suitable flexibly rigid material such as polypropylene plastic, high impact polystyrene plastic, or ABS plastic. Along these lines, it is also contemplated that the first and second set of keys 24, 32 are also constructed of the aforementioned materials. As understood, the multiple position switch must have sufficient flexing characteristics to depress the momentary pushbuttons 138a-c. It will be appreciated by one of ordinary skill in the art that alternative switch modalities may be utilized, such as a combination sliding and rotary switch, and the like.

With reference to FIG. 8, according to another aspect of the present invention, the one-handed keyboard 10 includes one or more USB ports 144 accessible from a side thereof. More particularly, the bottom cover 46 of the primary keypad 22 defines a lower notch 146, and the upper cover 148 defines an upper notch 148 co-extensive with the lower notch 146. It is also contemplated that a memory card reader may be similarly incorporated into a side of the primary keypad 22. Such a memory card reader may support a variety of memory card formats including SmartMedia, xD, MultiMediaCard (MMC), RSMMC, MMC Mobile, MMC+, Secure Digital (SD), MiniSD, Compact Flash, Memory Stick, Memory Stick Duo, and so forth.

Figure 9:
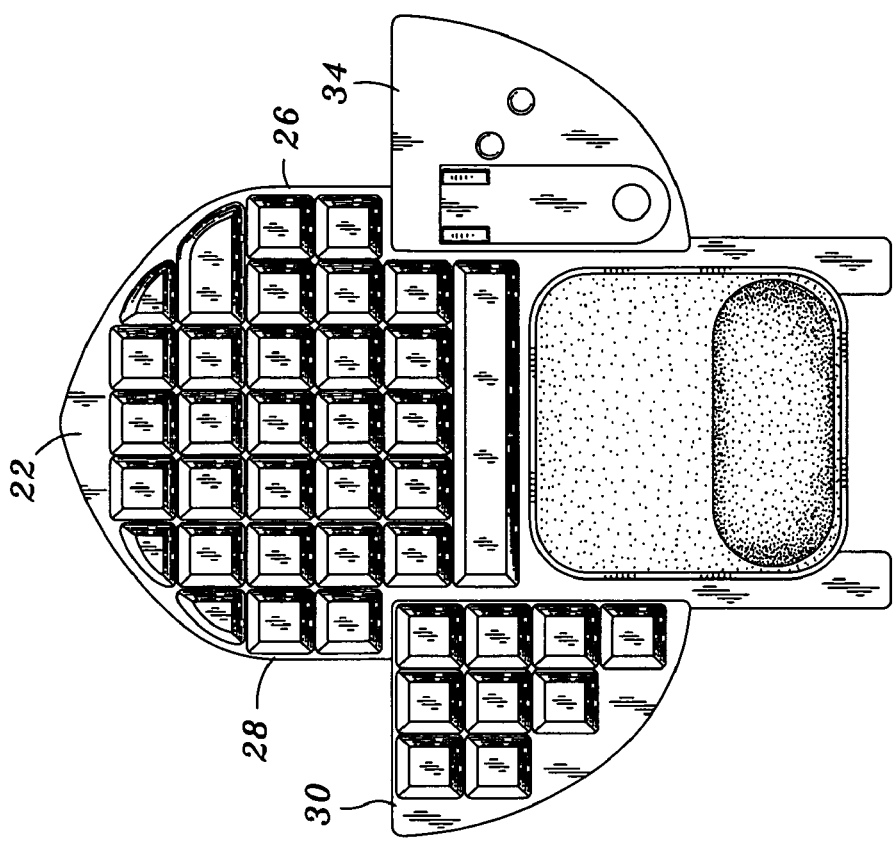
FIG. 9 is a top plan view of the one-handed keyboard in a right-handed operation configuration.
Figure 10:
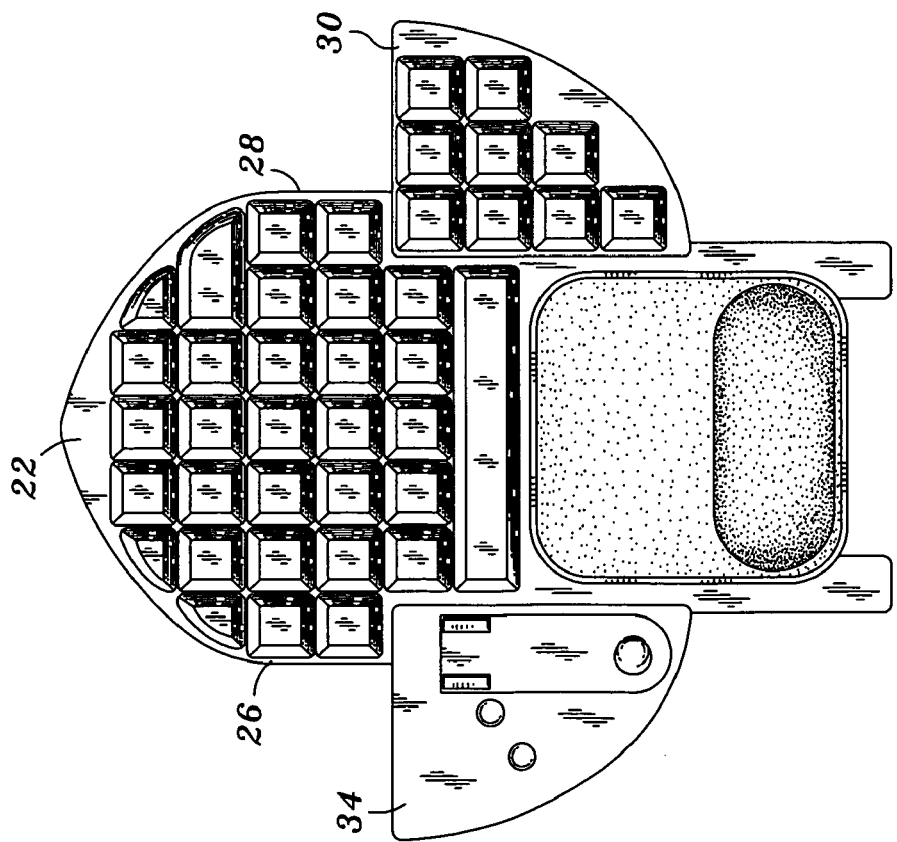
FIG. 10 is a top plan view of the one-handed keyboard in a left-handed operation configuration.

Referring to FIGS. 9 and 10, it is contemplated that the one-handed keyboard has both a left-handed configuration and a right-handed configuration. As particularly shown in FIG. 9, the one-handed keyboard 10 is configured as a right-handed version, where the input selection pad 34 is disposed on the first, or left side 26 of the primary keypad 22, while the auxiliary keypad 30 is disposed on the second, or right side 28 of the primary keypad. On the other hand, FIG. 10 shows the one-handed keyboard 10 in a left-handed version with the position of the input selection pad 34 and the auxiliary keypad 30 being reversed. It is to be understood, however, that the input selection pad 34 and the auxiliary keypad 30 may not be interchangeable between the left-handed configurations and the left-handed configurations.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

What is claimed is:

1. A keyboard for one-handed data input, comprising:
a primary keypad defining a first side and an opposed second side, the primary keypad having a first set of keys arranged in spaced rows and columns;
an auxiliary keypad disposed on the first side of the primary keypad and projecting therefrom, the auxiliary keypad having a second set of keys arranged in spaced rows and columns;
an input selection pad disposed on the second side of the primary keypad and projecting therefrom, the input selection pad including a multiple position switch; and
a rest pad centrally mounted to the primary keypad;
wherein each of the keys is mapped to a corresponding input value generated in response to an activation thereof;
wherein each of the keys of a subset have mapped thereto a plurality of corresponding input values, related input values being associated with an input value set;
wherein the multiple position switch selectively maps the keys of the subset to a one of the input value sets; and
wherein the multiple position switch has a plurality of angular stop positions, the multiple position switch further having an raised contact position and an lowered contact position at each of the angular stop positions, each of the raised and lowered contact positions being associated with a one of the selectively mapped input value sets.

2. The keyboard of claim 1, wherein the primary keypad includes a pair of opposed arms extending therefrom.

3. The keyboard of claim 1, wherein the rest pad further includes
a tray slidable engaged to the arms; and
a cushion removably attached to the tray.

4. The keyboard of claim 3, wherein the cushion is a neoprene shell filled with a supple gel material.

5. The keyboard of claim 2, wherein the input selection pad is slidably engaged to one of the arms.

6. The keyboard of claim 1, wherein the mapping between the input value and a one of the keys is user-programmable.

7. The keyboard of claim 1, wherein the input value set is selected from a group consisting of alphabetical characters, numerical characters, symbolic characters, function inputs, navigation inputs, and miscellaneous inputs.

8. A one-handed keyboard, comprising:
a primary keypad including a first set of keys each being associated with a one of first input values, a subset of the first set of keys each being associated with a one of second input values;
an input value selection pad with a mechanical switch positionable to select between the first input values and the second input values, the input value selection pad being engaged to the primary keypad; and
wherein the mechanical switch is a combination push and rotary switch with a plurality of angular stop positions, each angular stop position having an raised position and an lowered position, in the raised position the keys being mapped to the first input values, and in the lowered position the keys being mapped to the second input values.

9. The one-handed keyboard of claim 8, further comprising:
an auxiliary keypad including a second set of keys each being associated with an input value, the auxiliary keypad being engaged to the primary keypad.

10. The one-handed keyboard of claim 8, further comprising:
a palm rest tray slidably engaged to the primary keypad; and
an impact-absorbing palm rest pad disposed on the palm rest tray.

11. The one-handed keyboard of claim 8, wherein the first input values are lower case alphabetical characters, and the second input values are upper case alphabetical characters.

12. The one-handed keyboard of claim 8, wherein the first input values are numerical characters and the second input values are symbolic characters.

13. The one-handed keyboard of claim 8, wherein the first input values are navigation inputs and the second input values are function inputs.

14. The one-handed keyboard of claim 8, further comprising momentary pushbuttons disposed at each of the angular stop positions, the pushbuttons being activated with the combination push and rotary switch being in the lowered position, and the pushbuttons being deactivated with the combination push and rotary switch being in the raised position.

* * * * *